United States Patent
Iyer et al.

(10) Patent No.: US 10,839,094 B2
(45) Date of Patent: *Nov. 17, 2020

(54) PROGRESSIVE KEY ROTATION FOR FORMAT PRESERVING ENCRYPTION (FPE)

(71) Applicant: Bank of America Corporation, Charlotte, NC (US)

(72) Inventors: Shankar Ramasubramanian Iyer, East Windsor, NJ (US); Navanith R. Keerthi, Lawrenceville, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,360

(22) Filed: Nov. 26, 2018

(65) Prior Publication Data

US 2019/0108357 A1   Apr. 11, 2019

Related U.S. Application Data

(63) Continuation of application No. 15/276,125, filed on Sep. 26, 2016, now Pat. No. 10,157,289.

(51) Int. Cl.
*G06F 21/62* (2013.01)
*H04L 9/06* (2006.01)
*H04L 9/08* (2006.01)

(52) U.S. Cl.
CPC ........ *G06F 21/6218* (2013.01); *H04L 9/0618* (2013.01); *H04L 9/0891* (2013.01); *G06F 2221/2107* (2013.01)

(58) Field of Classification Search
CPC ......... G06F 21/6218; G06F 2221/2107; H04L 9/0618; H04L 9/0891; H04L 2209/24
See application file for complete search history.

(56) References Cited

U.S. PATENT DOCUMENTS

| 5,724,427 A | 3/1998 | Reeds, III |
| 7,864,952 B2 | 1/2011 | Pauker et al. |

(Continued)

OTHER PUBLICATIONS

Wolf SSL, "What is a Block Cipher?", dated Friday, Dec. 19, 2014, http://www.wolfssl.com/wolfSSL/Blog/Entries/2014/12/19_"What_is_a_Block_Cipher, html, retrieved Jun. 28, 2016, 2 pages.

(Continued)

*Primary Examiner* — Harunur Rashid
(74) *Attorney, Agent, or Firm* — Banner & Witcoff, Ltd.; Michael A. Springs

(57) ABSTRACT

Aspects of the disclosure provide a technological improvement to a cipher by improving data security of format-preserving encryption (FPE), by, inter alia, embedding specific key identifiers for rotating keys directly into ciphertext. Aspects of the disclosure relate to methods, computer-readable media, and apparatuses for improving data security in a format-preserving encryption (FPE) context by using specific methods of rotating and identifying the appropriate encryption key from among numerous rotating keys stored in a key data store. Specific to FPE, a plaintext of the data and its corresponding ciphertext of the data remain the same in length/size; yet the methods, computer-readable media, and/or apparatuses disclosed herein permit embedding of an identification of a specific key among the plurality of rotating keys for the particular ciphertext without compromising the technical requirements of FPE.

9 Claims, 8 Drawing Sheets

(56) References Cited

U.S. PATENT DOCUMENTS

| | | | |
|---|---|---|---|
| 7,945,049 B2 | 5/2011 | Schneider | |
| 8,600,048 B1 | 12/2013 | Hansen et al. | |
| 8,990,553 B2 | 3/2015 | Reno et al. | |
| 9,635,011 B1 | 4/2017 | Wu et al. | |
| 2002/0159599 A1* | 10/2002 | Matsui | H04L 9/0625 380/263 |
| 2008/0170693 A1 | 7/2008 | Spies et al. | |
| 2010/0284532 A1 | 11/2010 | Burnett et al. | |
| 2011/0280394 A1* | 11/2011 | Hoover | H04L 9/0625 380/28 |
| 2012/0143770 A1 | 6/2012 | Pauker et al. | |
| 2012/0317036 A1 | 12/2012 | Bower et al. | |
| 2017/0048059 A1 | 2/2017 | Murray | |
| 2017/0149565 A9 | 5/2017 | Pauker et al. | |
| 2017/0170952 A1 | 6/2017 | Hart et al. | |
| 2017/0243029 A1* | 8/2017 | Sprague | G06F 21/60 |
| 2018/0019866 A1* | 1/2018 | Kerschbaum | H04L 9/002 |
| 2018/0091294 A1 | 3/2018 | Iyer et al. | |

OTHER PUBLICATIONS

Transparent Data Encryption (TDE), Frequently Asked Questions, Oracle Database, http://www.oracle.com/technetwork/database/security/tde-faq-093699.html, retrieved Jun. 28, 2016, 8 pages.

NIST Special Publication 800-38G, Recommendation for Block Cipher Modes of Operation: Methods for Format-Preserving Encryption, by Morris Dworkin, dated Mar. 2016, 28 pages.

New NIST Security Standard Can Protect Credit Cards, Health Information, Information Technology Laboratory, dated Mar. 29, 2016, http;//www.nist.gov/itl/csd/new-nist-security-standard-can-protect-credit-cards-health-information.dfm, 1 page.

Multiple encryption—Wikipedia, https://en.wikipedia.org/wiki/Multiple_encryption, retrieved Jun. 28, 2016, 2 pages.

Luchaup, Daniel et al., "Formatted encryption Beyond Regular Languages", ACM, Nov. 3, 2014, pp. 1292-1303.

Format-preserving encryption, Wikipedia, retrieved Jun. 28, 2016, https://en.wikipedia.organ/wiki/Format-preserving_encryption#Comparison_to_block_ciphers, retrieved Jun. 28, 2016, 7 pages.

Format-Preserving Encryption (FPE), Data Masking, Datatype Agnostic, Referential Intregrity/HPE Security—Data Security, https://www.voltage.com/technology/data-encryption/hpe-format-preserving-encryption-, retrieved Jun. 28, 2016, 9 pages.

Block Cipher, Wikipedia, retrieved Jun. 28, 2016, https://en.wikipedia.org/wiki/Block_cipher, 13 pages.

Advanced Encryption Standard—Wikipedia, https;//en.wikipedia.org/wiki/Advanced_Encryption_Standard, retrieved Jun. 28, 2016, 10 pages.

A Few Thoughts on Cryptographic Engineering: Format Preserving Encryption, or, how to encrypt a credit card number through AES, dated Nov. 10, 2011, http://blog.cryptographyengineering.com/2011/11/format-preserving-encryption-or-how-to.html, retrieved Jun. 28, 2016, 5 pages.

May 3, 2018—U.S. Office Action—U.S. Appl. No. 15/276,121.
Mar. 20, 2018—U.S. Office Action—U.S. Appl. No. 15/276,121.

* cited by examiner

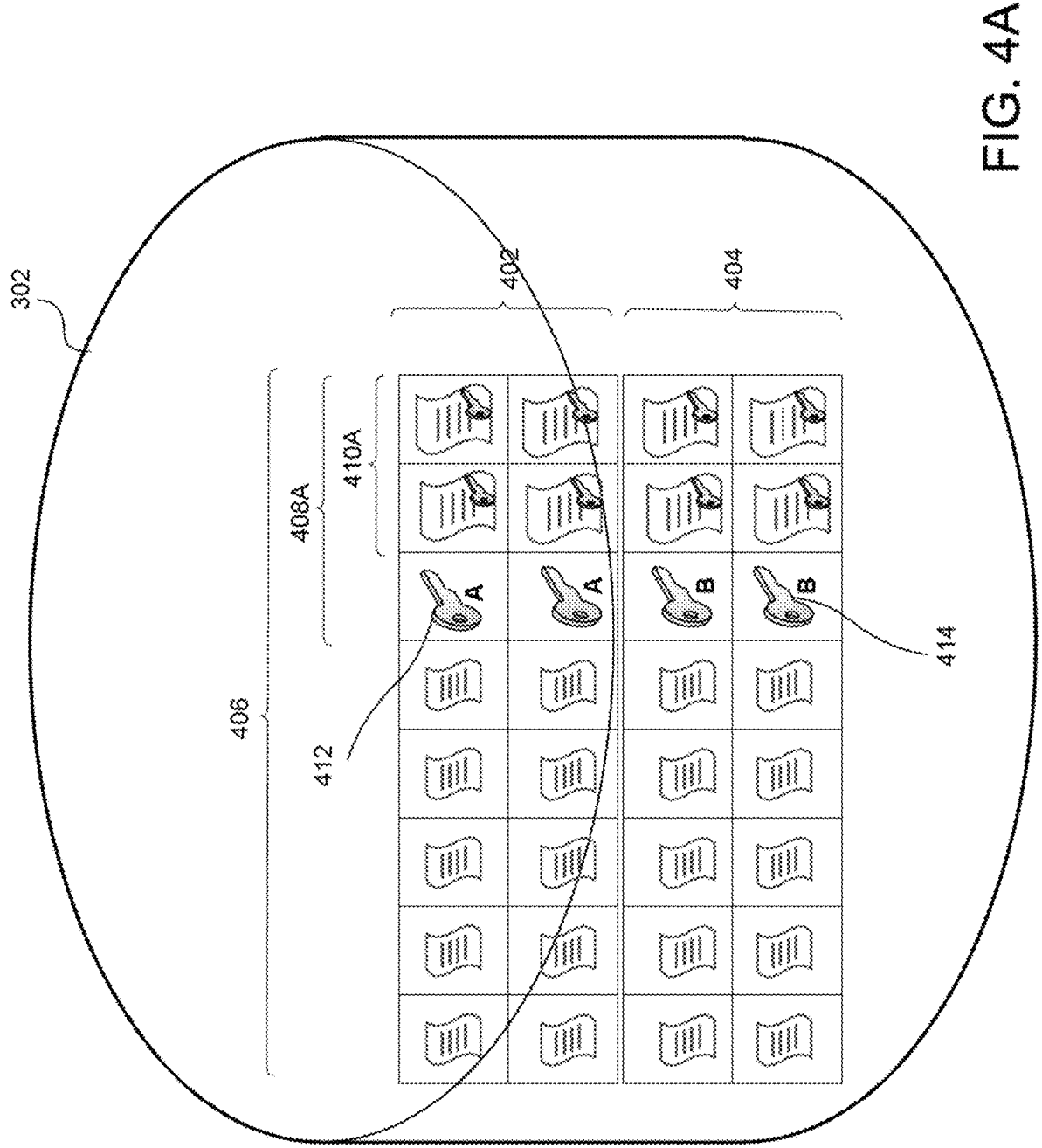

| | KEY 1 | KEY2 | ... | KEY26 |
|---|---|---|---|---|
| 000 | A00 | B00 | | Z00 |
| 001 | A01 | B01 | | Z01 |
| 002 | A02 | B02 | | Z02 |
| 003 | A03 | B03 | | Z03 |
| ... | | | | |
| 009 | A09 | B09 | | Z09 |
| 010 | A10 | B10 | | Z10 |
| ... | | | | |
| 098 | A98 | B98 | | Z98 |
| 099 | A99 | B99 | | Z99 |
| 100 | AA0 | BA0 | | ZA0 |
| 101 | AA1 | BA1 | | ZA1 |
| ... | | | | |
| 110 | AAA | BAA | | ZAA |
| ... | | | | |
| 136 | AB0 | BB0 | | ZB0 |
| ... | | | | |
| 146 | ABA | BBA | | ZBA |
| ... | | | | |
| 480 | AJK | BJK | | ZJK |
| ... | | | | |
| 500 | AK4 | BK4 | | ZK4 |
| ... | | | | |
| 999 | AXZ | BXZ | | ZXZ |

FIG. 5

PROGRESSIVE KEY ROTATION FOR FORMAT PRESERVING ENCRYPTION (FPE)

CROSS-REFERENCE TO RELATED APPLICATIONS

This application is a continuation of pending U.S. patent application Ser. No. 15/276,125 filed Sep. 26, 2016, the content of which is herein incorporated by reference in its entirety.

TECHNICAL FIELD

Aspects of the disclosure are drawn to a cipher that improves data security of format-preserving encryption (FPE) by embedding specific key identifiers for rotating keys. More generally, aspects of the disclosure are directed to an encryption/decryption service that simplifies and enables key rotation without the requisite overhead of decryption and/or encryption.

BACKGROUND

Many different types of encryption are known and contemplated by this disclosure. For examples, AES (advanced encryption standard), RSA, shared key, and others. The input into an encryption module is often referred to as "plaintext," and the output after encryption is often referred to as "ciphertext." Many of these encryption methodologies are use with credit card numbers, social security numbers, and other confidential information before transmission and/or storage of that information. In systems where confidential information is accepted only as a predetermined number of characters (e.g., sixteen-digit credit card number, nine-digit social security number, and others), encryption must take this requirement into account. One encryption methodology that meets this requirement is known as format-preserving encryption (FPE).

Online resource Wikipedia teaches examples of format-preserving encryption (FPE). Block ciphers traditionally work over a binary alphabet, i.e., both the input and the output are binary strings of n zeroes and ones. In some situations, however, a block cipher may be used that works over some other alphabet; for example, encrypting a plaintext 16-digit credit card number in such a way that the ciphertext is also a 16-digit number might facilitate adding an encryption layer to legacy software, such as is the example with FPE. More generally, FPE sometimes uses a keyed permutation on some finite language. A key is sometimes understood to be a secret bit string that parameterizes the permutation for a given block cipher. Meanwhile, some encryption schemes, such as cipher block chaining (CBC), are not permutations because the same plaintext can encrypt to multiple different ciphertexts, even when using a fixed key.

Moreover, various methods of FPE are described in the March 2016, National Institute of Standards and Technology's special publication number 800-38G entitled, "Recommendation for Block Cipher: Modes of Operation: Methods for Format-Preserving Encryption," which is herein incorporated by reference in its entirety of 28 pages and a copy of which is concurrently submitted in an Information Disclosure Statement with the filing of this application.

In addition to the challenge of encrypting data, there exists a technological challenge in managing encryption keys (e.g., generating, distributing, tracking, maintaining, and other operations involving keys). This challenge becomes markedly complex as new encryption keys are introduced into the technological ecosystem.

The aforementioned prior art solutions include various drawbacks and shortcomings leaving much room for improvement.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A communications network is disclosed comprising a public network and a private network, which is constrained to format-preserving encryption (FPE) that secures plaintext by transforming ciphertext with rotating encryption keys. Moreover, a data storage device is disclosed comprising memory storing plaintext encrypted with format-preserving encryption (FPE) and embedded with an encryption key ID. The data store and communications network work in conjunction to provide an improved, secure data network.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which:

FIG. 4A and FIG. 4B shows a system diagram of a data store secured with FPE data using transformed rotating, encryption key identifiers in accordance with an aspect of the disclosure.

FIG. 5 shows a high-level diagram of an illustrative mapping table that may be used by encoder and decoders in accordance with an aspect of the disclosure.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

The features disclosed herein overcome one or more drawbacks in format-preserving encryption systems to provide a technological improvement. Aspects of the disclosure relate to methods, computer-readable media, and apparatuses for improving data security in a format-preserving encryption (FPE) context by using specific methods of rotating and identifying the appropriate encryption key from among numerous rotating keys stored in a key data store. Specific to FPE, a plaintext of the data and its corresponding ciphertext of the data remain the same in length/size; yet the methods, computer-readable media, and/or apparatuses disclosed herein permit embedding of an identification of a specific key among the plurality of rotating keys for the particular ciphertext without compromising the requirements of FPE.

Figure 1:
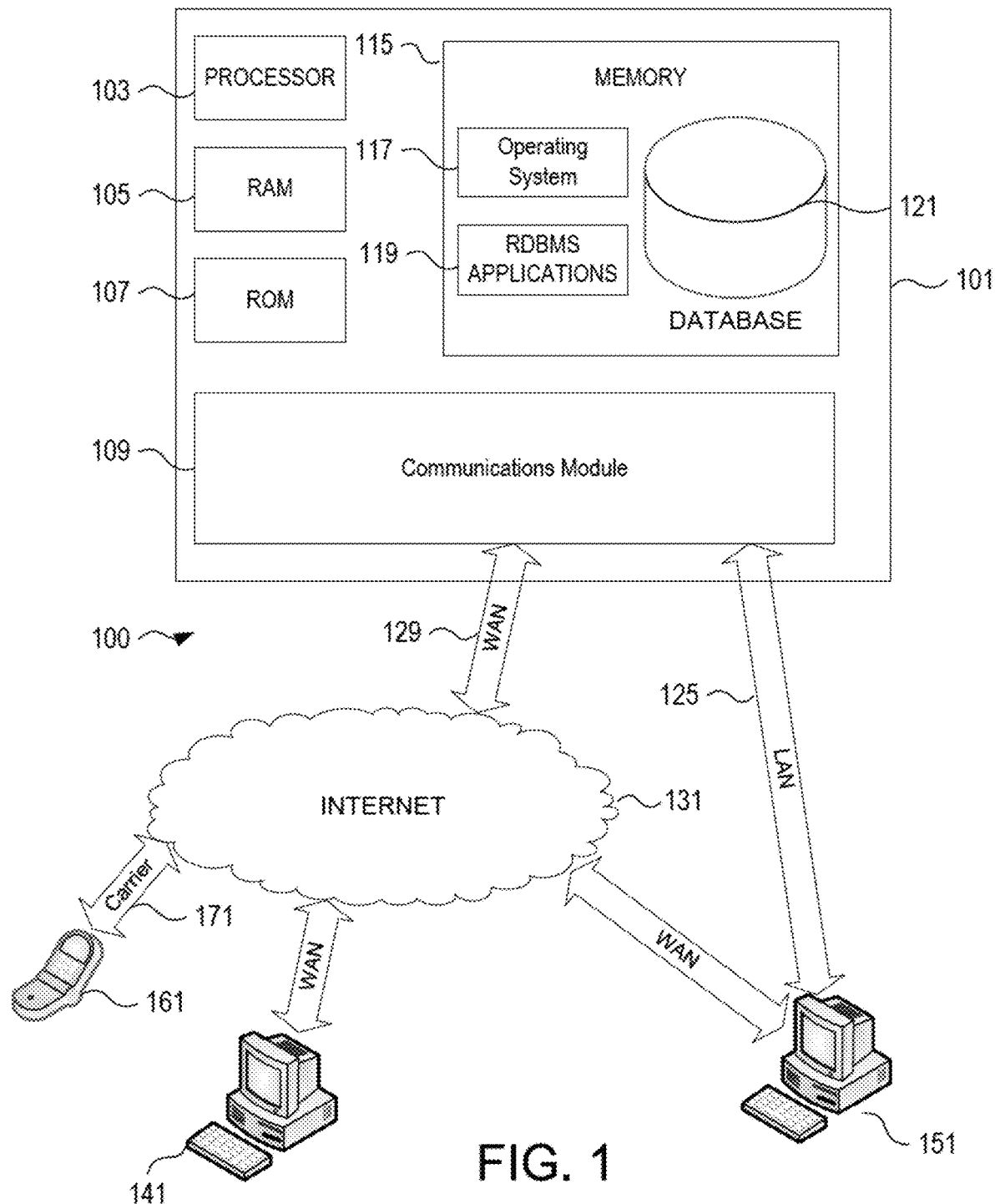
FIG. 1 illustrates an example of a suitable computing system environment that may be used according to one or more illustrative embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
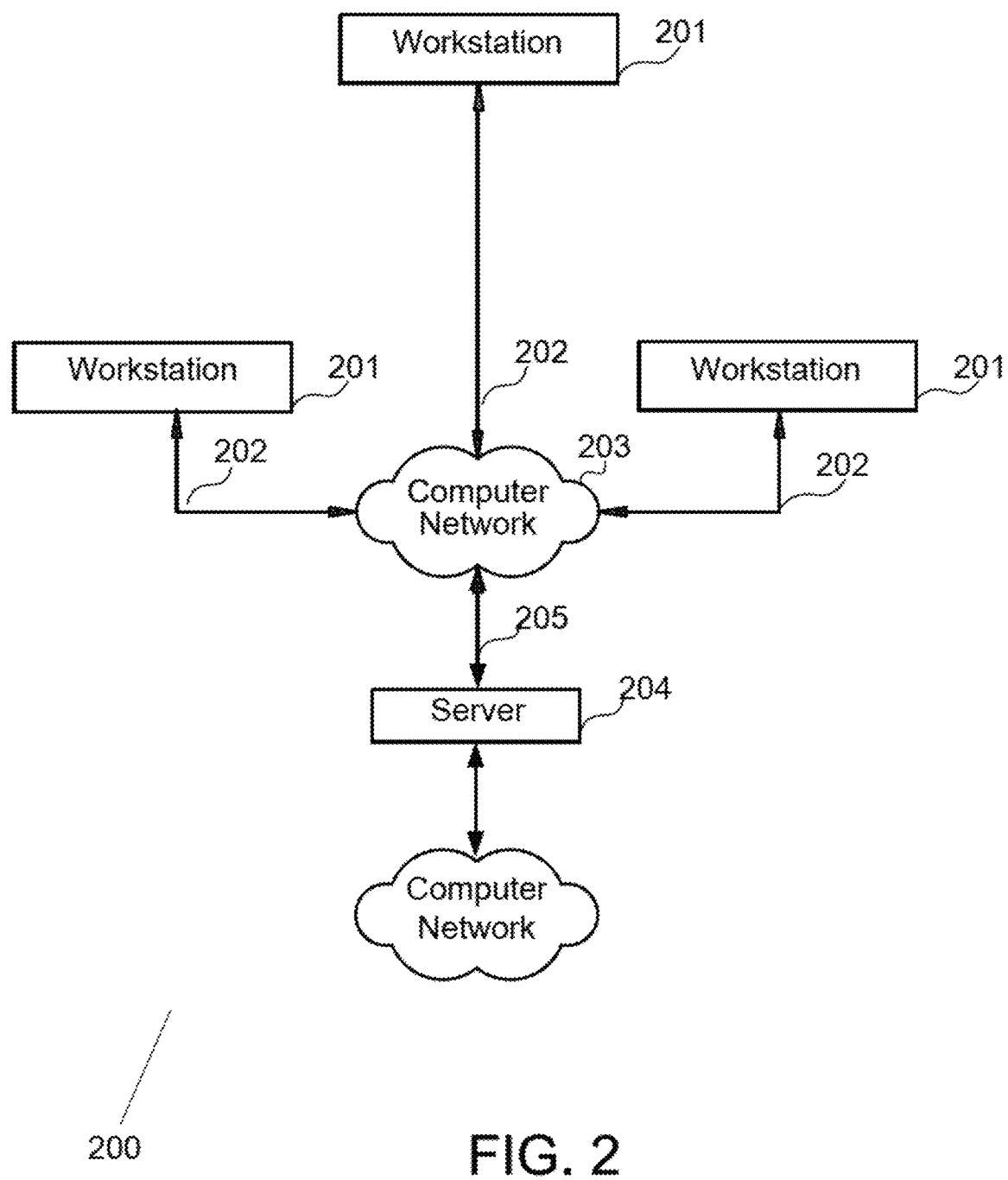
FIG. 2 shows an illustrative system for implementing example embodiments according to the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

The steps that follow in the Figures may be implemented by one or more of the components in FIGS. 1 and 2 and/or other components, including other computing devices.

Figure 3A:
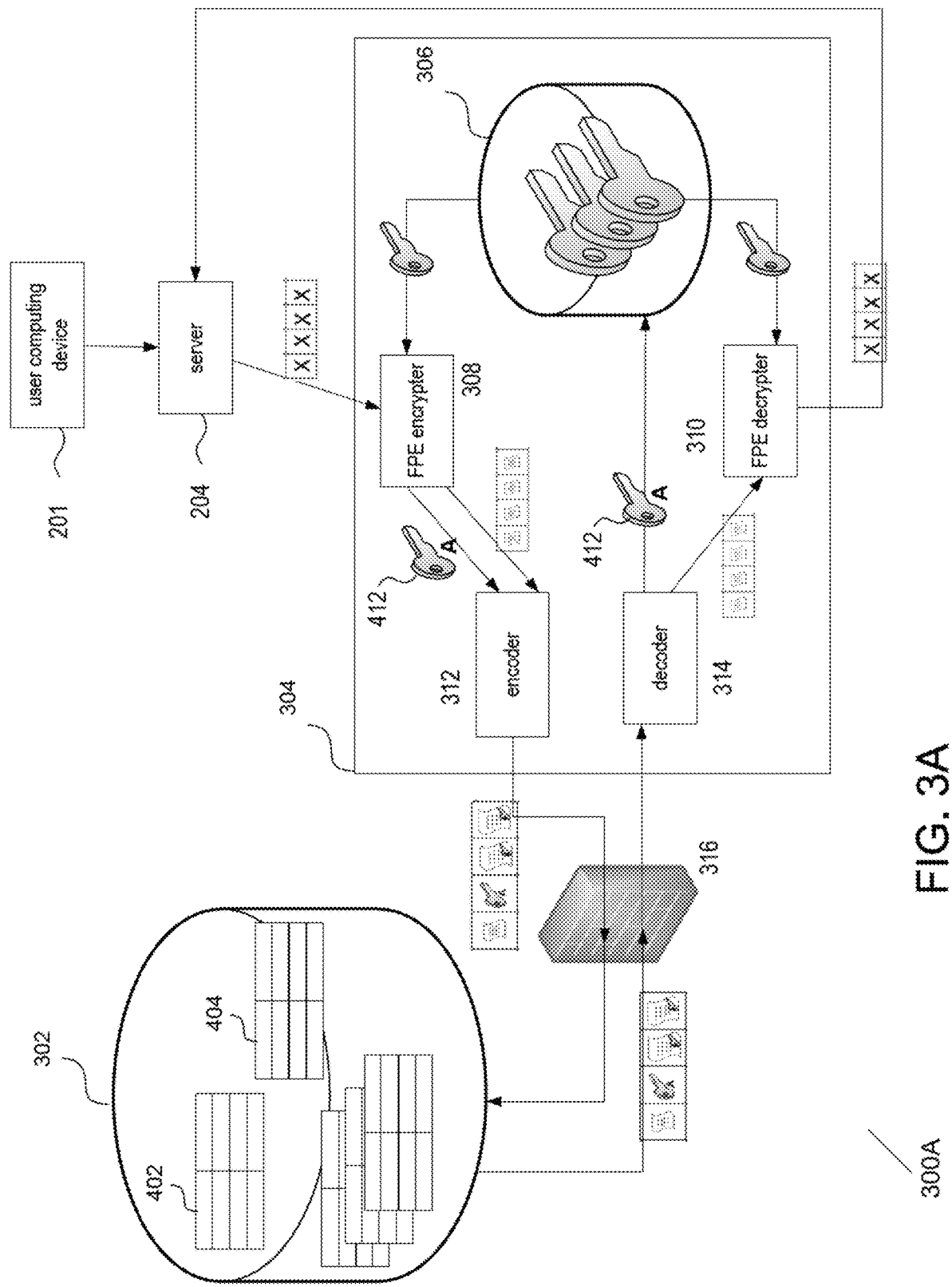
FIG. 3A, FIG. 3B, and FIG. 3C show versions of contemplated system with a plurality of computing components in communication with a FPE secure data store in accordance with an aspect of the disclosure.
Figure 3B:
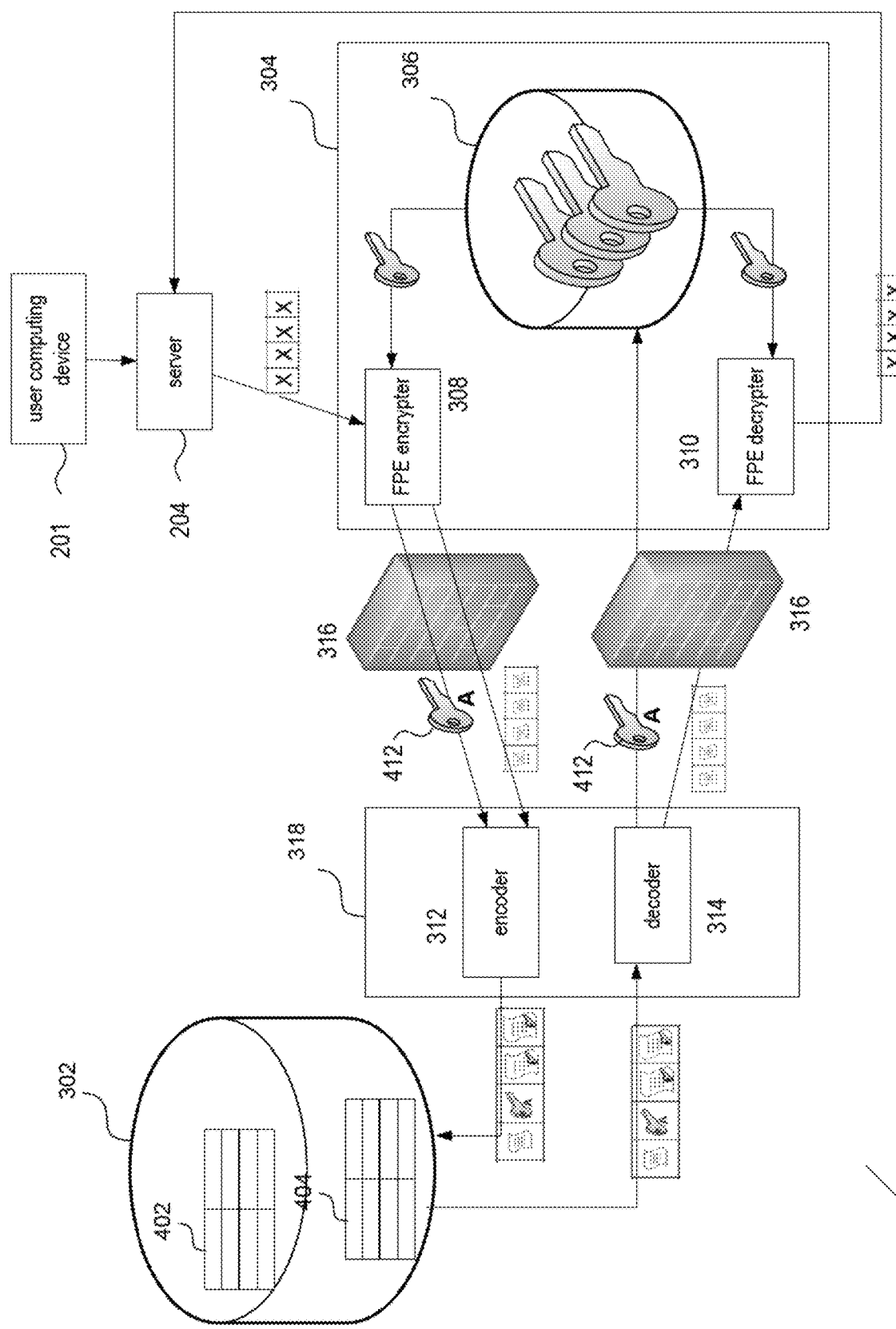
Figure 3C:
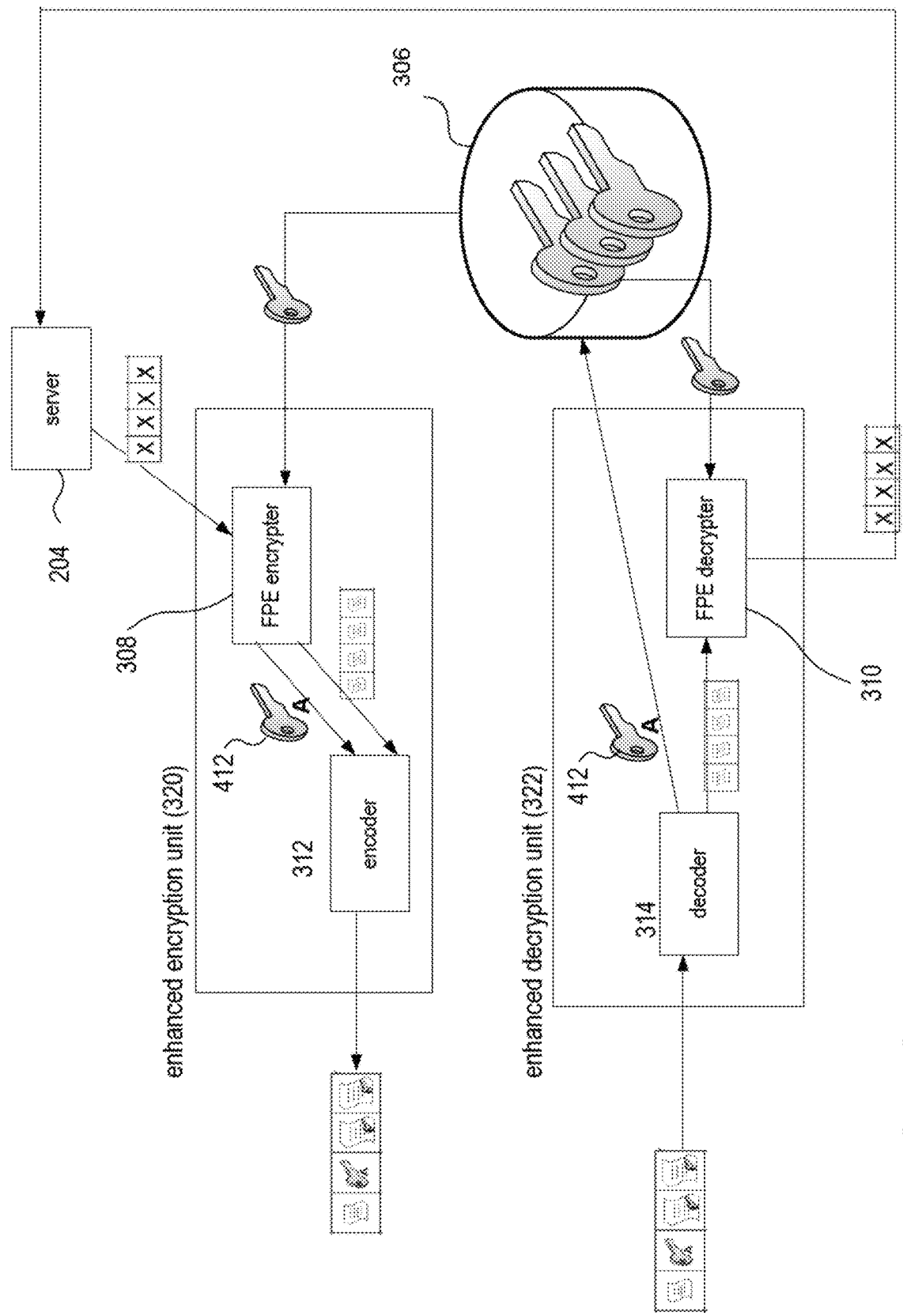

FIG. 3A, FIG. 3B, and FIG. 3C (collectively, "FIG. 3") show systems 300A, 300B with a plurality of network computing devices communicating over a network to provide a secure FPE network, in accordance with an aspect of the disclosure. Format-preserving encryption (FPE) provides an ability to encrypt plain text such that the output cipher text has the same length as input text. For example social security number (SSN) is 9 digits and all numeric data. If SSN is encrypted with FPE, then the output is also 9-digit all numeric data. Internally, FPE may use a block cipher (e.g., AES) that uses a symmetric key. Such an approach works fine if there is only one symmetric key used for encryption and all the data is encrypted with the same symmetric key. However if the symmetric key is rotated at some point (e.g., after a certain period) then conventional FPE is insufficient. To elaborate, after the symmetric key is rotated, the cipher text to be decrypted could have been encrypted with a previous symmetric key or a new rotated key. As such, FPE by itself is incapable of inherently supporting rotating keys.

To support symmetric key rotation, the system disclosed herein provides a mechanism by which the symmetric key used to encrypt the data is identifiable from within the FPE ciphertext itself. The correct key is identified and determined from the ciphertext, and then the decryption process proceeds with the correct key to return valid data. With FPE involving fixed length data, a mechanism is disclosed to embed a key identifier in the fixed length data without having to increase the length. In the case of all numeric fields such as a social security number (SSN) or credit card number, an approach of using alphabet (e.g., A . . . Z) to identify the key may be used. In some examples, the last three numbers of the fixed length data may be used to identify the key. The disclosure contemplates the aforementioned approach being expanded to more than three numbers.

To increase the responsiveness (e.g., reduce latency) of the encoder 312 and decoder 314, a mapping table may be used that stores pre-calculated mappings of alphanumeric values to the last three numbers of the fixed length data. Because, in this example, three digits are being used, the range is from 000 to 999. As such the alphabetic characters (A . . . Z) used to identify each rotating encryption key may be, in one example, as illustrated in FIG. 5. Because, in this one example, the character values of the ciphertext are limited to be only a possible 0, 1 . . . 8, 9 value, then the key identifier, with three digits, can accommodate up to a possible 1,296 values (i.e., 36 unique values of 0, 1 . . . 8, 9, A, B Y, Z in each digit) into just two digits. The 1,296 possible values can be mapped to the range of 000 to 999 that previously occupied three digits. As such, the remaining digit in the key identifier is open space for embedding of an encryption key ID while still maintaining the constraints of FPE.

Regarding FIG. 5, notably, the alphanumeric values (see columns KEY1, KEY2, . . . KEY26) in the mapping table occupy the same fixed-length space as the last three numbers (see column 506), and may be used to identify the key. As such, the constraints of a FPE ecosystem are maintained while still allowing for a key identifier to be injected into the FPE string. Thus, the FPE ciphertext string is transformed in accordance with various aspects of the disclosure. Moreover, with the example in FIG. 5, the number of rotating keys available to the system 300A is twenty-six (e.g., KEY1 . . . KEY26). However, in some examples, the number of available rotating keys may be increased to thirty-six if in addition to A . . . Z values, the values of 0 . . . 9 are also allowed for key ID. Moreover, in yet other examples, both upper and lower case alphabetic characters may be permitted to allow yet even more possible rotating key ID. One reason to limit key ID to just A . . . Z values is to allow for a quick comparison of the designated key ID character in a ciphertext string to determine if it is an alphabetic value in a normally all-numeric string. Thus, the determination can be made more efficiently.

In two examples illustrated in Table 1, below, the last three characters of a FPE ciphertext are translated/encoded with an embedded key identifier. Although in this illustrative system, the last three characters were pre-defined for the key identifier fields, other consecutive or non-consecutive characters may be used for the key identifier field in other examples.

TABLE 1

| Input | FPE before embedding key | FPE after embedding key |
|---|---|---|
| 123456789 | 877244098 | 877244A98 |
| 987654321 | 958688480 | 958688AJK |

Using the illustrative mapping table of FIG. 5, an input of "12345679" provided by a user computing device 201 would be sent to a server 204. The server 204 may communicate behind a firewall (not illustrated) the plaintext to a FPE encrypter 308 that encrypts the plaintext into ciphertext of "877244098".

Regarding the FPE encryption process, the encryption server system 304 retrieves a current encryption key from among the plurality of encryption keys pooled in the private memory 306 and provides it to the encrypter 308 for use in the FPE encryption process.

In some examples, the encryption server system 304 may comprise an enhanced encryption unit 320 and enhanced decryption unit 322, as illustrated in FIG. 3C. Alternatively, the FPE decrypter 310 and decoder 314 may be organized as separate units that coordinate and cooperate to produce a similar outcome, as illustrated in FIG. 3A. Likewise, the FPE encrypter 308 and encoder 312 may be organized as separate units that coordinate and cooperate to produce a similar outcome. The encrypter 308 encrypts with FPE the plaintext into ciphertext using the current encryption key provided to it. With FPE, the ciphertext is an identical fixed length as the plaintext.

Next, the ciphertext is then translated/encoded by the encoder 312 into "877244A98". The encoder 312 may store a mapping table 500 with a mapping 502 for converting "098" into "A98". The converting results in a translation/encoding of a key ID of "A" into the FPE ciphertext. The transformation of the ciphertext is performed by compressing a portion of ciphertext to create open space in the ciphertext to store the encryption key ID. Then, embedding the encryption key ID of "A" in the open space in the ciphertext without causing the ciphertext to change in length. The encryption key ID may be in plaintext (e.g., "A," which is readable and immediately identifiable as unique without decryption) or may be in a non-plaintext form.

Finally, this transformed ciphertext may be then be transmitted and stored in a data store 302 with other transformed ciphertext with the same key ID 402 or even a different key ID 404. Because the FPE ciphertext 406 is encoded with a key identifier 408A, 408B, it can now be effectively stored/archived anywhere without concern for which encryption key from a potential pool 306 of rotating encryption keys is the current key at the time the ciphertext needs to be decrypted for access. In addition, because the encoding of the key identifier 408A occurs in plaintext after the FPE encryption has already generated a ciphertext, the key ID 412 may be identified at any time without requiring decryption of the ciphertext. This ability to identify the key ID without requiring decryption permits users (e.g., a user of computing device 201, a security administrator of the overall system 300A, 300B, or other user) to more efficiently and effectively react in the event of a data breach of particular encryption keys. For example, a breach of just that encryption key corresponding to key ID 414 means that ciphertexts 402 in data store 302 is not at risk, and only ciphertexts 404 require remediation (e.g., taking offline particular data, immediate decryption and re-encryption with a new encryption key, and other actions).

In an example illustrating the decryption process, a server 204 may later request a stored, transformed ciphertext to be retrieved from data store 302, decrypted, and provided to user computing device 201. In one example, during the decryption process, the the last 3 characters, which correspond to the key identifier, are retrieved and processed. If the key ID in the key identifier is an "A", then, according to the example of FIG. 5, the system 300A, 300B will use Key1. Once they key is identified, the key identifier fields are replaced with the corresponding 3-digit number from FIG. 5. Then, the FPE decryption process may proceed with the FPE decrypter 310 being provided with an identification of which encryption key (e.g., key "A") to use for the decryption. The decrypter 310 requests the appropriate key from the key data store 306 and decrypts the ciphertext into the original plaintext value. That value may then be transmitted to the server 204 and eventually a user's device 201.

Referring to FIG. 3B, the ciphertext string is transmitted from the FPE encrypter 308 to an encoder 312. However, unlike the implementation 300A in FIG. 3A, in the FPE ecosystem implementation 300B of FIG. 3B the encoder 312 is positioned outside of the firewall 316. The encoder 312, in some examples, is implemented as a plug-in for a web browser. That plug-in may optionally also include a decoder 314. In such an example, the plug-in 318 may be executing in the context of a web browser running on a user computing device 201. Alternatively, the computer-executable instructions embodying the encoder 312 and decoder 314, which collectively may be referred to as a FPE coder 318, may be implemented in forms other than a plug-in for a web browser. For example, the FPE coder 318 may be implemented as client-side scripting code, such as Javascript (or asynchronous Javascript AJAX), executing in a web browser, and a data store 302 may store tables 402, 404 with Internet cookies or other Internet data files. In another embodiment, FPE coder 318 may be implemented as a standalone application installed on a user computing device 201 to interface with the FPE encrypter 308 and FPE decrypter 310 installed on an encryption server system 304.

In any event, the FPE coder 318 receives an input indicating which key ID 412 to use to encode the key identifier into the ciphertext. The FPE coder 318 will then use the encoder 312 to translate the bits 408A in the ciphertext corresponding to the key identifier into a compressed translation 410A based on a mapping table 500. The open space resulting from the translation (e.g., compression) is then occupied by the encryption key ID 412 provided as an input into the FPE coder 318 (e.g., encoder 312).

Meanwhile, for decoding, the decoder 314 includes instructions to extract the key identifier from the ciphertext stored in data store 302 without requiring the ciphertext to be decrypted. The key ID 412 in the key identifier 408A is used to identify which encryption key to use. In the example of the decoder 314, in addition to sending the original ciphertex to the FPE decrypter 310 for decryption, the decoder 314 also sends the encryption key ID (e.g., KeyA 412) so that the FPE decrypter 310 retrieves and/or uses the appropriate encryption key from the key storage pool 306. After the key ID has been retrieved from the ciphertext, the ciphertext may be translated back to its original ciphertext that can then be decrypted as typically done with FPE.

Figure 4B:
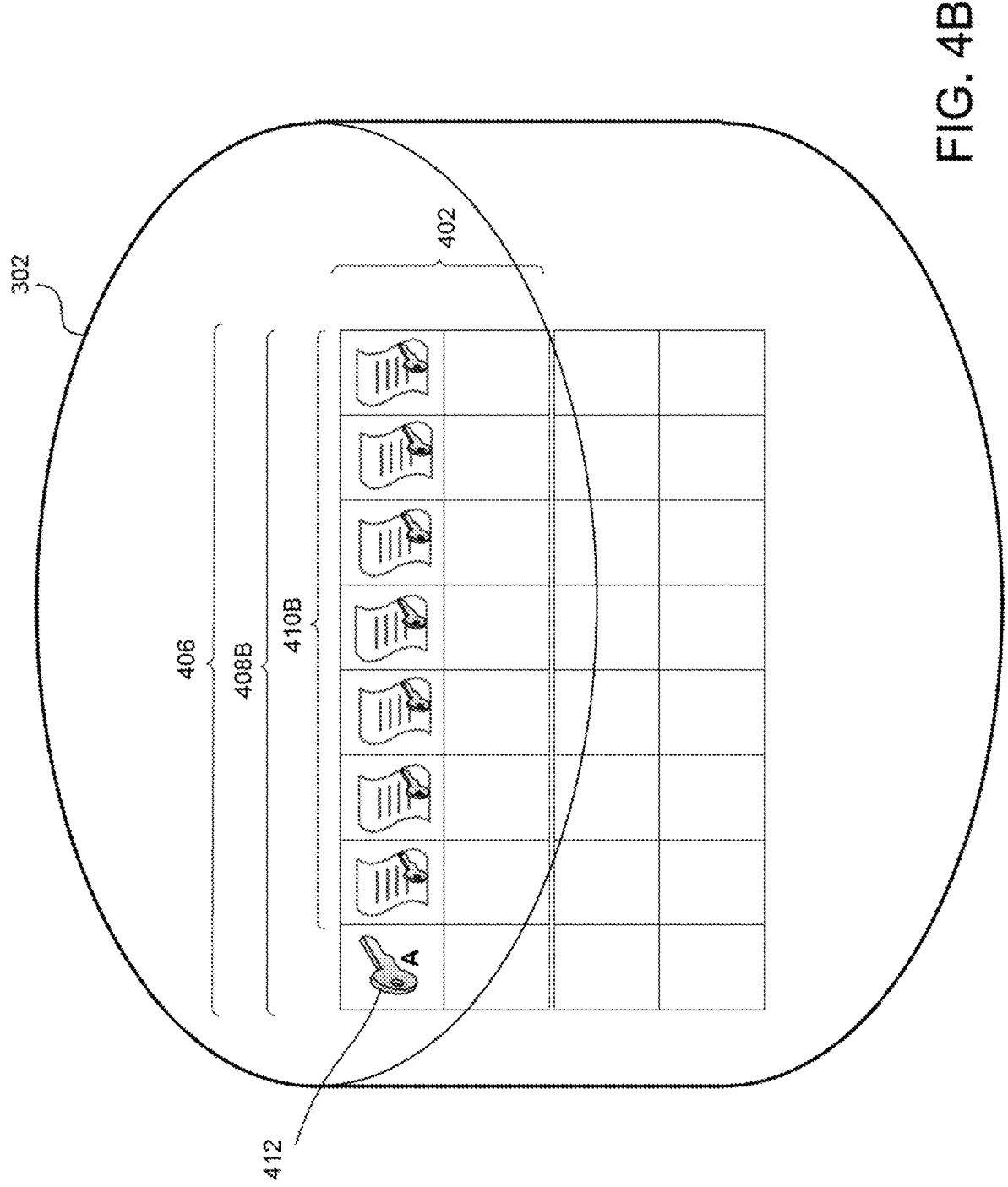

In the aforementioned examples, the FPE coder 318 performs the operations of encoding and decoding using a mapping table 500 as illustrated in FIG. 5. A single mapping comprises multiple key IDs 412, 414 and the corresponding translations for each key ID. For example, referring to the data store 302 in FIG. 4A, the memory stores ciphertext encrypted with different encryption keys such that entries 402 are encrypted and encoded with a first key ID 412 while entries 404 are encrypted and encoded with a different, second key ID 414. In one example, the data store 302 may be located at a user computing device 201 and the entries 402, 404 may correspond to Internet cookies or other data files managed by a browser (or other Internet software application) installed on the user computing device 201. As a result, the user computing device 201 has access to the mapping table 500 so that the encoder 312 and/or decoder 314 may use the mapping table 500 to translate the portion of the key identifier corresponding to the compressed translation 410A of the initial ciphertext into its original, initial ciphertext occupying more bits 408A than the compressed version 410A. In other words, the mapping table 500 may be, in some examples, a publicly and readily accessible data store and/or algorithm/formula available to all FPE coder 318.

The FPE coder 318 also includes the particular configuration information indicating which bits of the ciphertext contain the key identifier. For example, the configuration information may indicate that a predetermined number of right-most bits/bytes of a ciphertext contain the key identifier. In another example, the configuration information may indicate that a predetermined number of left-most bits/bytes of a ciphertext contain the key identifier. In yet another example, the configuration information may indicate that a predetermined number bits/bytes spread across a ciphertext contain the key identifier (e.g., see FIG. 4B in which the key identifier 408B is spread across the ciphertext 406 and indicates a key ID 412). For example, in FIG. 4B, the compressed version 410B of the ciphertext 406 runs almost the entirety of the initial ciphertext 406. Nevertheless, in some examples, a standard (or de facto standard) may dictate which bits and/or how many bits are occupied by the key identifier; and in such examples, the FPE coder 318 may be hard-coded with that information instead of including the entirety of the aforementioned configuration information. Furthermore, in alternate examples, a mapping table 500 may be replaced by a predetermined set of steps (e.g., an algorithm) performed to translate between original, initial ciphertext and its corresponding key identifier.

In the foregoing examples of FIG. 3B, at least one advantage of a FPE coder 318 separate from server machine 304 is the distribution of computing load across the network. This distribution reduces the computing load on the encryption server machine 304 while also potentially reducing latency/increasing responsiveness of the encoder 312 and decoder 314. In addition, in examples where data store 302 is located at the user computing device 201, a user is able to hold (e.g., control) their own encrypted data instead of relying upon another person/entity to hold and secure their data. Moreover, the aforementioned approach is operable even with a rotating key approach because, unlike prior format-preserving encryption (FPE) approaches, the ciphertext stored in data store 302 includes an embedded key identifier 408A, 408B comprising an encryption key ID 412. As a result the decoder 314 may retrieve the encryption ID 412 of the encryption key without requiring the decryption of the ciphertext or reference to a table. Rather, the encryption identifier 408A, 408B is accessible as plaintext at the appropriate bit/byte sequence.

Referring to FIG. 3C, a computer system is disclosed comprising an enhanced encryption unit 320 and enhanced decryption unit 322 to transfer plaintext data into a ciphertext value using format-preserving encryption (FPE) that has embedded in it a key identifier for rotating encryption keys. A server 204 may send plaintext to an enhanced encryption unit 320 for transformation into the aforementioned ciphertext. The transformation of the plaintext may include both encrypting it and then subsequently translating/compressing it to embed a key ID field 412.

The aforementioned transformation may include retrieving a current encryption key from among the plurality of encryption keys 306 in the private memory. The current encryption key may be uniquely identified by a first encryption key ID 412. The FPE encrypter 308 may then use the current encryption key to encrypt with FPE the plaintext into ciphertext. The FPE results in the ciphertext being an identical fixed length as the plaintext. In addition, to allow for a more robust encryption system, rotating keys may be used. After encrypting, the encoder 312 may compress a portion 408A of the ciphertext to create open space in the ciphertext to store the first encryption key ID 412. As explained herein, the compression includes using a readily accessible mapping table 500 to translate in a loss-less manner, to create the open space in the FPE ciphertext. Next, the Next, the encoder 312 embeds the first encryption key ID 412 in the open space in the ciphertext without causing the ciphertext 406 to change in length. The encryption key ID 412 may be plaintext such that it is readable without requiring decryption of the entire transformed ciphertext. Based on the quantity of different values the encryption key ID field (i.e., the open space) can hold, the number of different keys can be rotated from among the pool 306 of encryption keys. Finally, the transformed ciphertext 406 may be transmitted for storage as appropriate.

While FIG. 3A, FIG. 3B, and FIG. 3C shows alternative embodiments of various features disclosed herein, they illustrate a communications network 300A, 300B comprising a public network and a private network. The communications network is constrained by the fact that it uses, inter alia, format-preserving encryption (FPE) to secure plaintext by transforming it into ciphertext that is operable with rotating encryption keys. The communication network includes private memory 306, which is securely located on the private network behind a firewall, to store a plurality of encryption keys. The keys may be rotated and each key is assigned an unique encryption key ID. Since the encryption keys are stored in the private memory 306, it is generally inaccessible from outside of the private network. Meanwhile, various aspects of the enhanced encryption unit 320 and enhanced decryption unit 322 may be located inside and/or outside of the private network. Aspects of these units 320, 322 transform the plaintext into ciphertext and then into transformed ciphertext, as explained herein.

The features disclosed herein may also be used with other types of data that would benefit from encryption while maintaining the formatting of its plaintext and ciphertext. In one example, maintaining formatting includes keeping the length of bits of the ciphertext the same as the length of bits of the plaintext. In addition, any encrypted data that uses rotating keys to encrypt the data would benefit from the features disclosed herein. In some examples, encryption keys may be rotated more or less frequently than in other examples. For example, the encryption key used to encrypt plaintext data may be changed (e.g., rotated) on a time basis (e.g., monthly, annually, weekly, bi-annually, bi-monthly, bi-weekly, daily, hourly, or other time period) and/or based on the current date. In another example, the current key may be changed based upon occurrence of an event. Some examples of events include receipt of more than a threshold quantity of denial of service (Dos) attacks (or other type of malicious attack/threat) by a system, receipt of a software update from an anti-malware software provider, and/or consumption of an excess of a predetermined amount of data throughput over a network of the system. Moreover, in some example, key rotation may be done automatically or manually depending on a company's policies. Automatic encryption key rotation may be done when a key has expired or after a certain number/quantity of usage. Manual key rotation may be performed on-demand (e.g., on-the-fly, dynamically) when a compromise is detected or simply to have greater coordination between teams/applications when this occurs. A FPE key manager is incorporated in the system 300A, 300B to manage and rotate between the plurality of encryption keys 306. The key manager 306 may provide the current key to an authorized FPE encrypter 308; and in the case of an FPE decrypter 310, upon input of a specific key ID 412, the key manager 306 may provide the corresponding key from the pool of keys.

In one example involving optimization of hexadecimal digits in a ciphertext, the system 300A, 300B results in an improvement in memory consumption. In one example, assume that social security numbers are securely stored using format-preserving encryption (FPE), as generally described herein. With social security numbers (SSN), the range of possible plaintext values for each character in each of the nine characters in a SSN is 0 . . . 9. In decimal notation, values of 0 through 9 each require 4 bits for storage. Coincidentally, hexadecimal notation also required 4 bits for each hexadecimal character, however, with hexadecimal notation, values of A . . . F are also possible for each character without consuming any additional bits. In other words, at a minimum, a SSN consumes 36 bits of memory (or 9 hexadecimal characters in memory). Given the aforementioned, the key identifier 408A for a SSN number is a minimum of six characters (or 24 bits of memory). The six characters (with each character being 4 bits in length) can collectively represent a maximum integer value of 999,999. Meanwhile, once optimized for hexadecimal notation, the 999,999 integer value can be compressed/translated into the bits required for just five characters (i.e., 20 bits). In other words, the maximum decimal value of 2^20 (i.e., 0 . . . 1,048,575), which be represented by five characters, is greater than the 999,999 integer value. As such, in this example, with a six-digit key identifier 408A, five of those digits are allocated to the compressed/translated ciphertext 410A while still allowing one character (i.e., 4 bits) for the plaintext-readable key ID field (e.g., the field storing key IDs 412, 414). Furthermore, the 4-bit key ID field permits up to 16 rotating, encryption key IDs corresponding to hexadecimal values of 0 . . . 9, A . . . F. In some examples, the system 300A, 300B may restrict the key ID values to just A . . . F (i.e., six rotating keys) to clearly flag the encryption key ID field in the ciphertext of the SSN.

The preceding SSN example assumed the ciphertext resulting from FPE encryption of a nine-digit SSN results in a nine-digit number comprising just 0 . . . 9. However, in some examples, while the plaintext SSN comprises just 0 . . . 9 values, the resulting ciphertext may not be limited to just 0 . . . 9 values. In those instances, the calculation of the minimum length of key identifier 408A will result in a length different than six characters. For example, if values of 0 . . . 9 and "A" are possible in the ciphertext of a SSN, then the desired length of the key identifier is eight hexadecimals (i.e., 32 bits). Meanwhile, in other examples, the key ID field may be less than the full bit-count of a character of the SSN. In other words, assuming each character in the SSN is allocated 4 bits, just two bits of the 4 bits of a character may be allocated to the key ID field. In such an example, the number of rotating keys is limited to just four keys; moreover, the FPE coder 318 in such a system may be more heavily relied upon to decode/translate the key ID field because a user may not be able to simply view a character of the SSN to immediately identify the value of the key ID field. Rather, some computations may be desired before the identification is possible.

While the preceding example references each character consuming just 4 bits of memory, in another example, each character may be represented as ASCII (e.g., UTF-8 or other formatting). In an ASCII example, each character of a SSN, or other form field (e.g., a credit card number field) may require 1 byte (or 8 bits) of memory. Like with the preceding hexadecimal example, in the ASCII example, the additional bits provide potential, additional open space for compression and translation. As such, given all things being the same, a minimum-length key identifier in the ASCII example may be shorter in length than the hexadecimal example. Moreover, ASCII provides for a greater range in human-readable character values, as illustrated in Table 2, including lower case and upper-case alphabet characters, as well as allocations for special characters:

TABLE 2

| Dec | Hex | Binary | Character | Description |
| --- | --- | --- | --- | --- |
| 32 | 20 | 00100000 | Space | space |
| . . . | | | | |
| 44 | 2C | 00101100 | , | comma |
| 45 | 2D | 00101101 | - | minus |
| 46 | 2E | 00101110 | . | period |
| 47 | 2F | 00101111 | / | slash |
| 48 | 30 | 00110000 | 0 | zero |
| 49 | 31 | 00110001 | 1 | one |
| 50 | 32 | 00110010 | 2 | two |
| . . . | | | | |
| 57 | 39 | 00111001 | 9 | nine |
| . . . | | | | |
| 65 | 41 | 01000001 | A | |
| 66 | 42 | 01000010 | B | |
| 67 | 43 | 01000011 | C | |
| . . . | | | | |
| 90 | 5A | 01011010 | Z | |
| . . . | | | | |
| 97 | 61 | 01100001 | a | |
| 98 | 62 | 01100010 | b | |
| . . . | | | | |
| 122 | 7A | 01111010 | z | |
| . . . | | | | |
| 127 | 7F | 01111111 | | |

Of course, in some example, the key identifier may be longer than the minimum-length for one or more reasons, including spanning the entire ciphertext 408B.

While the preceding example uses social security number (SSN) for purposes of illustration, other types of data may also be encrypted and encoded/translated as disclosed herein. For example, credit card numbers and other confidential information may be secured using the systems and methods disclosed herein. Credit card numbers may be represented, in some embodiments, as sixteen-digit numbers composed of a four-six digit bank identification number (BIN) followed by a personal account number (PAN) followed by a special checksum digit that's computed deterministically based on the previous digits. For example, with some credit card company providers, the credit card number may occupy just fifteen digits and include a PAN as short as eight digits. In other examples contemplated by this disclosure, a plaintext credit card number may be a different predefined length of characters, including a combination in some examples of numbers and/or alphabetic characters. And, the credit card number may be composed of all, some, none, or other portions besides those listed here. In addition, besides credit card numbers, other examples of unique identifiers for payment systems and other systems are contemplated. For example, a unique bit string of a different length may be used by mobile payment providers, such as those using near field code (NFC) or other short-range wireless communication protocols, to authorize a secure payment instruction.

In yet other examples, data other than credit card numbers is contemplated for use with the systems and methods disclosed herein. For example, social security numbers and other confidential user identification information may be secured for transmission and storage using one or more of the features disclosed herein. Like a credit card number with its various predefined portions, this confidential user identification information may also be comprised of one or more predefined portions. In addition to credit card numbers and social security numbers, other data contemplated by this disclosure include, but is not limited to, government identifications with fixed formatting such as passport numbers, alien registration cards, permanent residence cards, and other unique identification information.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

We claim:

1. A system comprising:
  a format-preserving encryption (FPE) module configured to be executed by a processor of a user computing device; and
  a memory storing plaintext encrypted with the FPE module and embedded with an encryption key ID, the memory comprising:
    a first ciphertext encrypted with the FPE module using a first encryption key, wherein the first ciphertext is a fixed length of bits equal to a length of the plaintext, wherein the first ciphertext is embedded with a first key identifier that, without requiring decryption of the entire first ciphertext, identifies the first ciphertext as having been encrypted with the first encryption key; and
    a second ciphertext encrypted with the FPE module using a second encryption key, wherein the second ciphertext is of the same fixed length of bits as the first ciphertext, wherein the second ciphertext is embedded with a second key identifier that, without requiring decryption of the entire second ciphertext, identifies the second ciphertext as having been encrypted with the second encryption key;
  wherein the first ciphertext and second ciphertext are stored together in a single memory and wherein each key identifier is structured with a first portion of bits storing the encryption key ID and a second portion of bits storing a compressed translation of that portion of ciphertext that initially populated the bits corresponding to the key identifier, and
  wherein the encryption keys are rotated based on one of: a time basis, and an occurrence of an event, and
  wherein a maximum quantity of rotating encryption keys for the ciphertext corresponds to a maximum number of unique values capable of being stored at any given time within the first portion of bits corresponding to the encryption key ID.

2. The system of claim 1, wherein the FPE module compresses the first ciphertext encrypted without requiring access to a current encryption key and without decrypting the first ciphertext.

3. The system of claim 1, wherein the FPE module is located on the public network and a FPE encrypter is located on the private network.

4. The system of claim 1, wherein the first portion of bits storing the encryption key ID is four bits, and the memory stores different ciphertext encrypted with the FPE module with up to sixteen rotating encryption keys.

5. The system of claim 1, wherein the first encryption key and second encryption key are symmetric keys.

6. The system of claim 1, wherein the first ciphertext corresponds to numeric values and less than all hexadecimal values.

7. The system of claim 1, wherein the event comprises receipt one of: more than a threshold quantity of denial of service attacks, a software update from an anti-malware software provider, and consumption of an excess of a predetermined amount of data throughput.

8. The system of claim 1, wherein the FPE module is located on a public network, a current encryption key is located on a private network, and the private network automatically rotates the current encryption key that is retrieved from the private memory based upon occurrence of an event.

9. The system of claim 1, wherein the FPE module comprises instructions that, when executed by the processor, cause the FPE module to:
  after receiving a new ciphertext encrypted with the FPE module using a current encryption key, compressing a portion of the new ciphertext to create open space in the new ciphertext to store a first encryption key ID;
  embedding the first encryption key ID in the open space in the new ciphertext without causing the new ciphertext to change in length, wherein the first encryption key ID is in plaintext, which is readable without decryption; and
  transmitting the transformed new ciphertext with the embedded first encryption key ID for storage in the memory.

* * * * *